United States Patent [19]

Kobayashi et al.

[11] Patent Number: 4,991,535
[45] Date of Patent: Feb. 12, 1991

[54] SHIFT LEVER UNIT FOR AUTOMOTIVE AUTOMATIC TRANSMISSION

[75] Inventors: Satoshi Kobayashi, Hiratsuka; Katsunori Shirahama, Atsugi; Tsuyoshi Todoriki, Yokosuka; Hiroshi Yamazaki, Yokohama, all of Japan

[73] Assignees: Nissan Motor Company, Ltd.; Ohi Seisakusho Co., Ltd., both of Japan

[21] Appl. No.: 538,067

[22] Filed: Jun. 14, 1990

[30] Foreign Application Priority Data

Jul. 5, 1989 [JP] Japan .................................. 1-175002

[51] Int. Cl.⁵ .......................... G01D 13/04; G09F 9/00
[52] U.S. Cl. .......................... 116/28.1; 116/DIG. 20; 362/26; 362/30
[58] Field of Search ................ 116/28.1, 29, DIG. 20, 116/DIG. 21, 288, 286; 362/26, 30; 40/546, 616

[56] References Cited

U.S. PATENT DOCUMENTS

| | | | |
|---|---|---|---|
| 3,929,092 | 12/1975 | Ogura | 116/28.1 |
| 3,985,095 | 10/1976 | Nurse | 116/28.1 |
| 4,446,809 | 5/1984 | Dennis | 116/28.1 |
| 4,565,151 | 1/1986 | Buma | 116/28.1 |
| 4,798,160 | 1/1989 | Mochida et al. | 116/28.1 |
| 4,911,096 | 3/1990 | Munakata | 116/28.1 |

FOREIGN PATENT DOCUMENTS

| | | | |
|---|---|---|---|
| 3142098 | 5/1983 | Fed. Rep. of Germany | 116/286 |
| 3347014 | 7/1985 | Fed. Rep. of Germany | 116/288 |
| 0047912 | 12/1979 | Japan | 116/28.1 |
| 0021780 | 5/1982 | Japan | 116/28.1 |
| 0009334 | 1/1986 | Japan | 116/28.1 |

Primary Examiner—William A. Cuchlinski, Jr.
Assistant Examiner—John L. Beres
Attorney, Agent, or Firm—Lowe, Price, Leblanc, Becker & Shur

[57] ABSTRACT

A shift lever unit is disclosed, which comprises a shift lever; a housing of plastic having an upper cover portion, the upper cover portion being formed with a slot through which the shift lever passes; a position mark plate of transparent plastic mounted on the upper cover portion, the position mark plate having a plurality of position marks on an upper surface thereof; a light blocking layer covering the upper surface of the position mark plate except the positions where the position marks are located; a light source installed in the housing; a light conductive member of transparent plastic, the light conductive member including a horizontal part whose leading end is formed with a first light reflecting surface and located behind the position mark plate, a vertical part which is formed with a rounded recess from which the light rays from the light source enter the vertical part, and a jointed part at which the horizontal and vertical parts are jointed, the jointed part being formed with a second light reflecting surface by which the light rays from the rounded recess is reflected toward the first light reflecting surface; a plurality of raised window portions formed by the horizontal part of the light conductive member, the window portions being exposed to the outside of the housing at positions beside the position marks; and a pointer movably located within the housing below the raised window portions, the pointer being movable together with the shift lever, wherein the first light reflecting surface is granulated.

11 Claims, 5 Drawing Sheets

SHIFT LEVER UNIT FOR AUTOMOTIVE AUTOMATIC TRANSMISSION

BACKGROUND OF THE INVENTION

1. Field of the Invention

The present invention relates in general to shift lever units for automotive automatic transmissions, and more particularly to shift lever units of a type which is equipped with a shift position indicator.

2. Description of the Prior Art

In order to clarify the task of the present invention, one conventional shift lever unit will be described with reference to FIGS. 7 and 8 of the accompanying drawings.

As shown in FIG. 8, the conventional shift lever unit comprises a shift lever 51 which is pivotally supported by a support structure 46a secured to a base plate 46. The base plate 46 is tightly mounted on a vehicle floor (not shown) and has a housing structure mounted thereon, which structure includes generally a pair of U-shaped supporting brackets 45 and a shift lever position indicating device 40.

The position indicating device 40 comprises a stepped cover structure 41 of opaque plastic, which is mounted on the paired U-shaped supporting brackets 45 and formed with an elongate slot 41b through which the shift lever 51 extends.

As is understood from Pig. 7, the cover structure 41 is provided beside the elongate slot 41b with a transparent elongate part 41a which extends along the slot 41b. The transparent elongate part 41a comprises an elongate position plate 43 integrally molded with the cover structure 41. The position plate 43 is constructed of a transparent plastic, such as acrylate resin or the like, and has at a lower surface thereof engraved position marks 42, such as, "1", "2", "D", "N", "R" and "P". The engraved marks 42 are filled with white paint.

The lower surface of the position plate 43 is entirely coated with dark paint 43a except six limited portions 42a which are respectively located beside the position marks 42, as is seen from FIG. 8.

As is seen from FIG. 7, the position plate 43 has an inwardly projected portion 43b which is directed toward an electric lamp 52 mounted in a lamp housing secured to the cover structure 41. The position plate 43 has further a light reflecting surface 43c at a junction portion between the major part thereof and the inwardly projected portion 43b. Thus, upon energization of the lamp 52, the light emitted from the lamp 52 enters the position plate 43 from the inwardly projected portion 43b and is reflected by the light reflecting surface 43c toward the graved position marks 42. Thus, the position marks 42 are illuminated from within.

The position indicating device further comprises a pointer 44 which is colored red and movable together with the shift lever 51 along a given way which is defined below and along the aligned six limited transparent portions 42a. That is, when the shift lever 51 is moved to a certain position, for example, to the "reverse position" of the associated transmission, the pointer 44 assumes one paintless limited portion 42a which is located beside the position mark "R". Thus, the red color of the pointer 44 is viewed through the paintless limited portion 42a and thus the driver can easily recognize the position which the shift lever 51 has just assumed.

As shown in FIG. 8, a plurality of electric wires 49 extend from known electric devices mounted within the housing structure. These wires 49 are bundled into several groups each having an electric connector 50 connected thereto. The wires 49 are held by a resin-coated metal clip 47 which is welded to the base plate 46. That is, by bending the clip 47, the wire holding is achieved.

However, the above-mentioned conventional shift lever unit has the following drawbacks due to its inherent construction.

First, since the position plate 43 has an upper surface largely exposed to the outside of the cover structure 41, direct rays of the sun toward the cover structure 41 causes a great reflection of the rays on the largely exposed upper surface of the position plate 43. This makes the recognition of the position marks and the pointer by the driver very difficult.

Second, upon energization of the electric lamp 52, part of the light rays from the lamp 52 reaches directly the pointer 44 without travelling within the position plate 43. This causes an extreme dazzling of the pointer 44.

Third, because the upper surface of the position plate 43 is largely exposed to the open air, the same is liable to flaw and crack due to increased possibility of being rubbed by something. This lowers the external appearance of the position plate 43 and thus that of the shift lever unit.

SUMMARY OF THE INVENTION

It is therefore an object of the present invention to provide a shift lever unit which is free of the above-mentioned drawbacks.

According to the present invention, there is provided a shift lever unit whose shift lever position indicating device can provide a viewer or driver with easy recognition of the shift lever position even when direct rays of the sun reach directly to the position indicating device.

According to the present invention, there is further provided a shift lever unit whose position indicating device is so constructed that illumination of the position pointer is achieved by only the light rays which, after being emitted from an electric lamp, travel within a light conductive member.

According to the present invention, there is further provided a shift lever unit which comprises a shift lever; a housing of plastic having an upper cover portion, the upper cover portion being formed with a slot through which the shift lever passes; a position mark plate of transparent plastic mounted on the upper cover portion, the position mark plate having a plurality of position marks on an upper surface thereof; a light blocking layer covering the upper surface of the position mark plate except the positions where the position marks are located; a light source installed in the housing; a light conducive member of transparent plastic, the light conductive member including a horizontal part whose leading end is formed with a first light reflecting surface and located behind the position mark plate, a vertical part which is formed with a rounded recess from which the light rays from the light source enter the vertical part, and a jointed part at which the horizontal and vertical parts are jointed, the jointed part being formed with a second light reflecting surface by which the light rays from the rounded recess is reflected toward the first light reflecting surface; a plurality of raised window portions formed by the horizontal part of the light conductive member, the window portions being exposed to the outside of the housing at positions beside the position marks; and a pointer movably located within the housing below the raised window portions, the pointer being movable together with the shift lever, wherein the first light reflecting surface is granulated.

According to the present invention, there is further provided a shift lever unit which has an improved knob mounted on a top of the shift lever.

According to the present invention, there is provided a shift lever unit which has connector holders by which electric connectors are detachably held.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
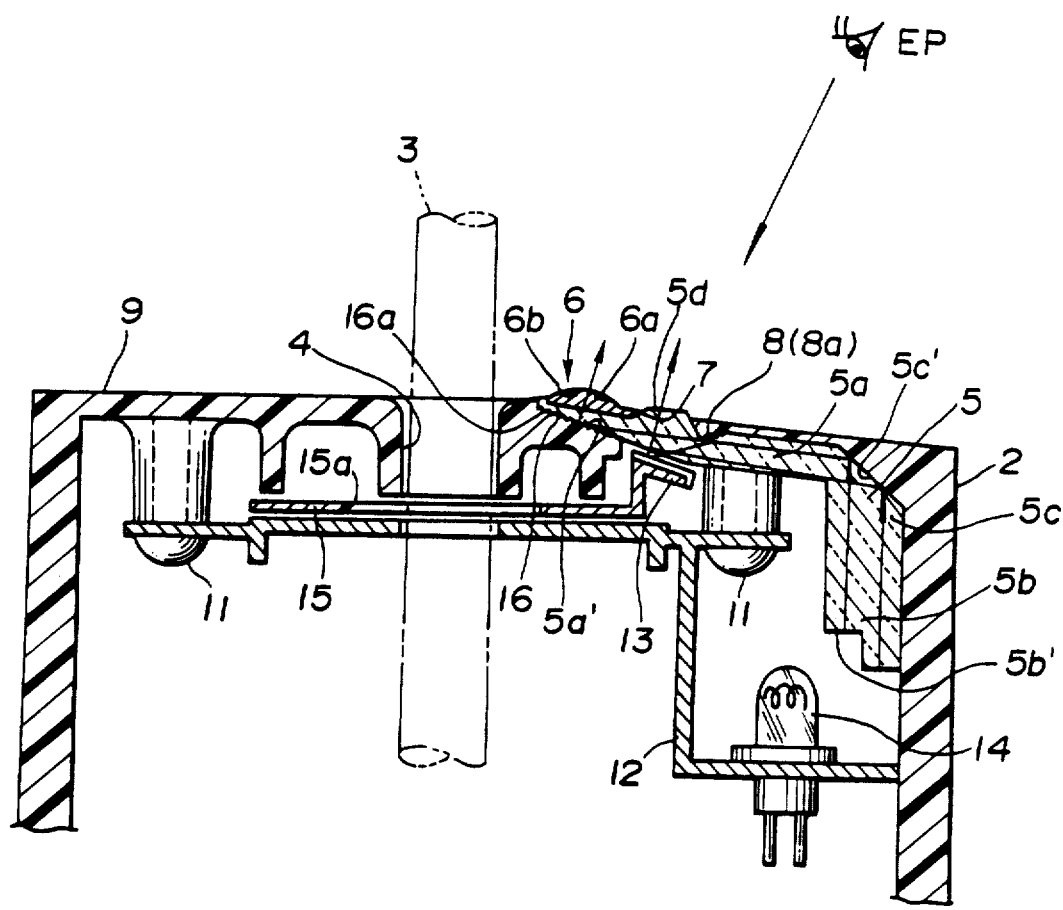
FIG. 1 is a sectional view of an essential part of a shift lever unit according to the present invention.
Figure 2:
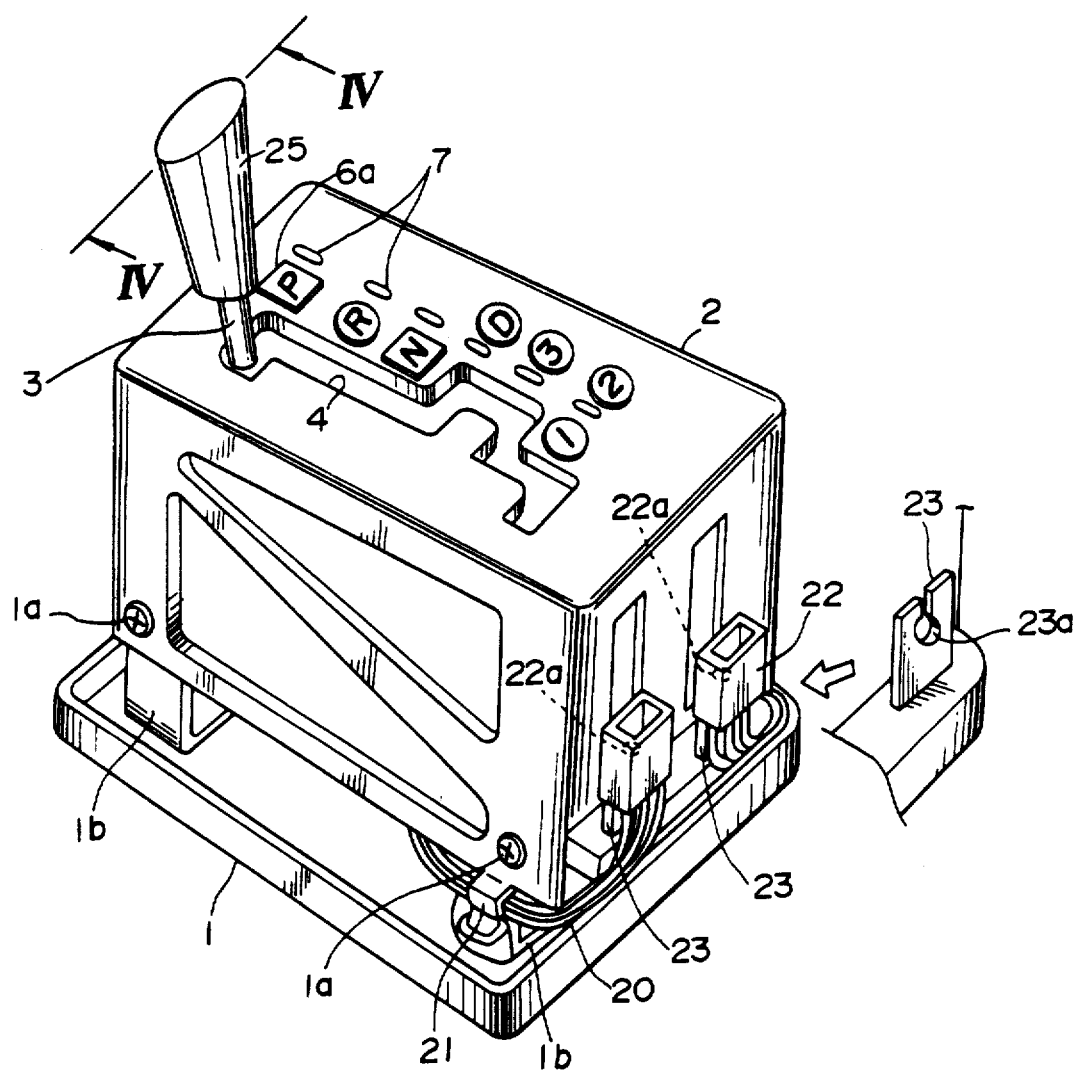
FIG. 2 is a perspective view of the shift lever unit of the Present invention.

Referring to FIGS. 1 and 2, there is shown a shift lever unit according to the present invention.

As is well understood from FIG. 2, the shift lever unit of the invention comprises generally a shift lever 3, a rectangular base plate 1, a rectangular parallelepiped housing 2 mounted on the base plate 1, and a known pivot mechanism mounted within the housing 2 for operatively supporting the shift lever 3. The base plate 1 and the housing 2 are molded from reinforced opaque plastic. For mounting the housing 2 on the base plate 1, a pair of supporting brackets 1b are disposed on the base plate 1. Bolts 1a are used for securing the housing 2 to the brackets 1b. The base plate 1 is tightly mounted on a vehicle floor (not shown) through bolts or the like.

The housing 2 has at an upper cover portion (no numeral) an elongate key-shaped slot 4 formed therethrough. The shift lever 3 passes through the slot 4 to travel in and along the same in so-called zigzag manner. As is seen from FIG. 2, the slot 4 is so shaped as to guide the shift lever 3 to predetermined work positions which are Parking (P), Reverse (R), Neutral (N), Drive (D), Third speed (3), Second speed (2) and First speed (1) positions.

As is understood from FIG. 1, an elongate position mark plate 6 of transparent plastic is integrally molded with the housing 2. As is seen from FIG. 2, the position mark plate 6 has a plurality (seven in the illustrated embodiment) of raised portions 6b which are arranged along the slot 4 of the housing 2. The raised portions 6b are respectively formed with engraved position marks 6a, such as, "P", "R", "N", "D", "3", "2" and "1", each being filled with white paint.

It is to be noted that the outer surface of the position mark plate 6 is coated with opaque dark paint except the portions where the position marks 6a are located.

As is seen from FIG. 2, six small oval openings 7 are formed in the upper cover portion of the housing 2, which extend straightly along the slot 4. More specifically, the forward three of the openings 7 are located at right sides of the position marks "P", "R" and "N", the other two are located at left sides of the position marks "D" and "3", and the remaining rearward one is located between the position marks "2" and "1".

As is seen from FIG. 1, an elongate light conductive member 5 is installed in the housing 2 in a manner to extend along the slot 4. The light conductive member 5 is constructed of a transparent plastic, such as, acrylate resin or the like, and has a generally L-shaped cross section.

That is, the light conductive member 5 generally comprises a horizontal part 5a and a vertical part 5b which intersect at generally right angles at a junction part 5c thereof.

The horizontal part 5a has a tapered leading portion 5a' placed just behind the position mark plate 6. As shown, the leading portion 5a' has a flat upper surface which intimately contacts with a lower flat surface of the position mark plate 6 and has a tapered lower surface 16 whose leading part is granulated as designated by numeral 16a.

The granulated lower surface 16 is intimately attached to a tapered surface (no numeral) of the housing 2. The leading portion 5a' has further six small raised window portions 5d which are respectively received in the oval small openings 7 of the housing 2. As shown, each raised window portion 5d has an upper surface somewhat projected outward from the corresponding opening 7.

As is understood from FIG. 1, near the six raised portions 5d, the horizontal part 5a of the light conductive member 5 is provided at the upper surface thereof with a groove 8 which extends along the six raised portions 5d. The groove 8 is defined by two inclined side walls, one being granulated as designated by numeral 8a.

The vertical part 5b of the light conductive member 5 is formed with a rounded recess 5b' at a leading end thereof. The rounded recess 5b' is so shaped as to face toward an electric lamp 14.

The lamp 14 is mounted in a lamp housing 12 installed in the housing 2. The lamp housing 12 has an upper extension (no numeral) secured to the inner surface of the housing 2 through bolts 11.

The junction part 5c of the light conductive member 5 is formed with an inclined outer surface 5c' which is seated on an inclined flat inner surface of the housing 2.

As is shown in FIG. 1, the shift lever unit further comprises a slide plate 15 which is axially movable when the shift lever 3 moves in the slot 4. For the axial movement of the slide plate 15, the same is formed with a laterally extending slot 15a through which the shift lever 3 passes. The slide plate 15 has a raised extension which serves as a pointer 13. The pointer 13 is formed with an inclined upper surface which faces up to a lower part of the tapered lower surface 16 of the horizontal part 5a of the light conductive member 5. The upper surface of the pointer 13 is colored with red paint.

Upon energization of the electric lamp 14, the light rays emitted from the lamp 14 enter the light conductive member 5 from the rounded recess 5b' and are reflected leftward in FIG. 1 by the light reflecting surface 5c' of the junction part 5.

The light rays travelling in the horizontal part 5a and coming to the granulated lower surface 16 of the part 5a are reflected upward toward the position mark plate 6. Thus, the positions marks 6a (viz., "P", "R", "N", "D", "3", "2" and "1") clearly stand out against an illuminated background produced by the light rays. Because of the granulation of the lower surface 16, the illumination of the background for the position marks 6a is softened.

The light rays coming to the inclined side wall 8a of the groove 8 are reflected toward the lower part of the inclined lower surface 16 and projected outside from the surface 16. Thus, when the pointer 13 assumes a certain position, for example, a position near the position mark "P", the light rays from the surface 16 are reflected by the pointer 13 toward one raised window portion 5d which is located beside the mark "P". Accordingly, the red color of the pointer 13 is illuminated and viewed through the raised window portion 5d. Thus, the driver can recognize the position which the shift lever 3 has just assumed. Because of the granulation of the side wall 8a of the groove 8, the view of the red color through the window portion 5d is softened.

As shown in FIG. 2, the housing 2 is provided at one side thereof with two connector holders 23 which extend upward from a common base portion (no numeral) secured to the housing 2. Each holder 23 has a slit 23a formed therethrough. Two electric connectors 22 are held by the holders 23 having connecting pins 22a thereof detachably engaged with the slits 23a in a snap action manner. Each electric connector 22 has a plurality of electric wires 20 which extend to known electric devices mounted in the housing 2. The electric wires 20 are bundled and held by a catching pawl 21 which is defined by the housing 2.

Because the electric connectors 22 are stationarily held by the holders 23, the manual work for coupling partner connectors (not shown) with the connectors 22 is easily carried out.

Figure 3:
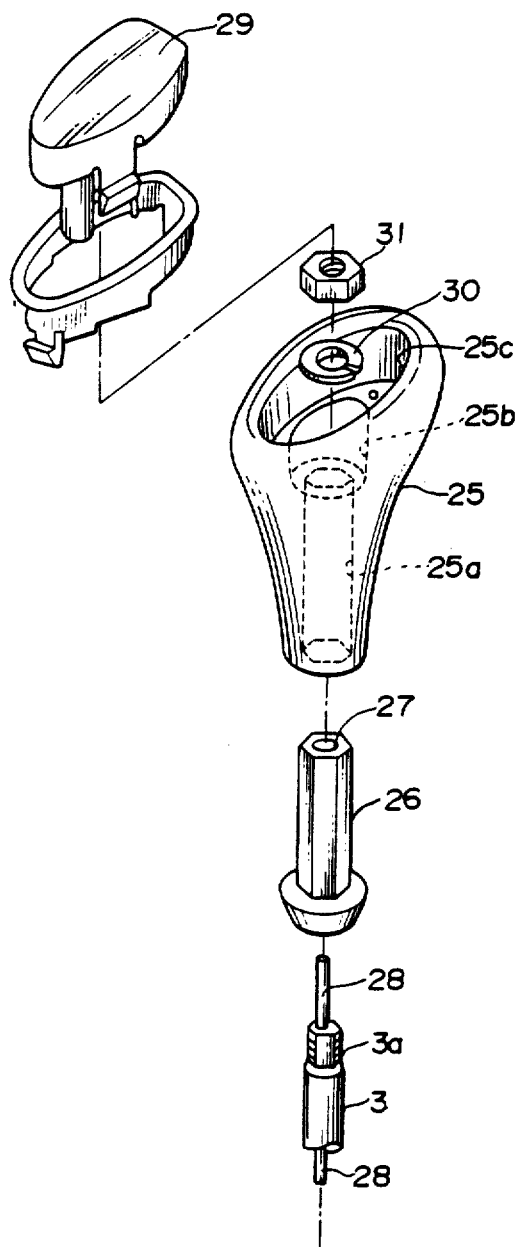
FIG. 3 is an exploded view of a control knob mounted on a top of the shift lever.
Figure 4:
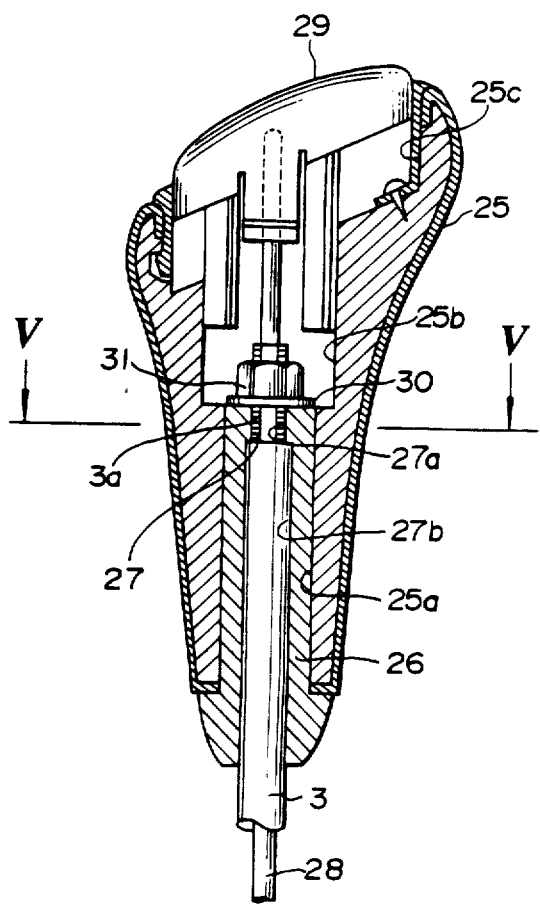
FIG. 4 is a sectional view of the control knob in an assembled condition, which view is taken along the line N—N of FIG. 2.
Figure 5:
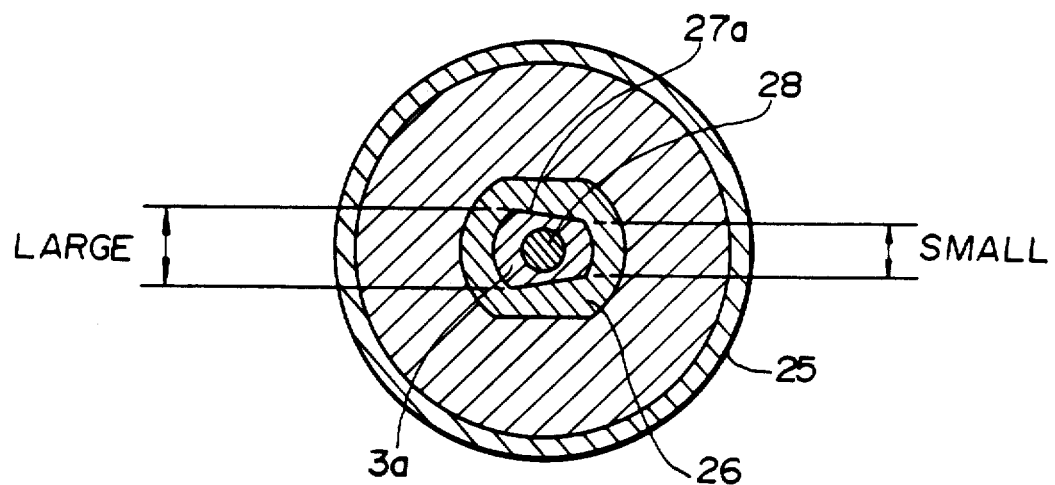
FIG. 5 is a sectional view taken along the line V—V of FIG. 4.

Referring to FIGS. 3, 4 and 5, there is shown a control knob 25 which is mounted on a top of the shift lever 3. As shown in Pig. 3, the knob 25 has a bore formed therethrough, which bore includes a smaller diameter elongate lower part 25a, a middle diameter intermediate part 25b and a larger diameter upper part 25c. The knob 25 has a metal core 26 tightly received in the smaller diameter elongate lower part 25a. The metal core 26 has a longitudinally extending bore 27. The bore 27 includes a smaller diameter upper part 27a and a larger diameter lower part 27b, as shown in FIG. 4. The shift lever 3 has at a top thereof a hollow bolt 3a through which a control rod 28 passes.

As shown in FIG. 4, the top of the shift lever 3 is inserted in the larger diameter bore 27b of the metal core 26 having the bolt 3a passed through the smaller diameter upper part 27a.

As is seen from FIG. 5, the bolt 3a is cut out at diametrically opposed portions to provide two flat portions thereon. The cut flat portions of the bolt 3a are not parallel. The smaller diameter upper part 27a of the bore 27 has a cross section which matches with that of the bolt 3a. Thus, a tight connection between the bolt 3a and the knob 25 is achieved only when the bolt 3a is properly engaged with the smaller diameter upper part 27a of the bore 27. This means that mismatching of the knob 25 to the shift lever 3 is assuredly suppressed.

A nut 31 is screwed about the bolt 3a to tightly connect the knob 25 to the shift lever 3. Denoted by numeral 30 is a sprinG washer which is disposed between the nut 31 and the metal core 26. A push button 29 is operatively disposed in the larger diameter upper recess 25c of the knob 25. The push button 29 has the control rod 28 connected thereto.

Figure 6:
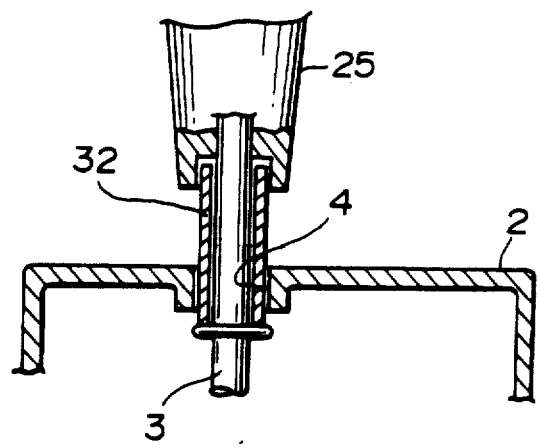
FIG. 6 is a sectional view of a modification of the shift lever unit of the present invention.
Figure 7:
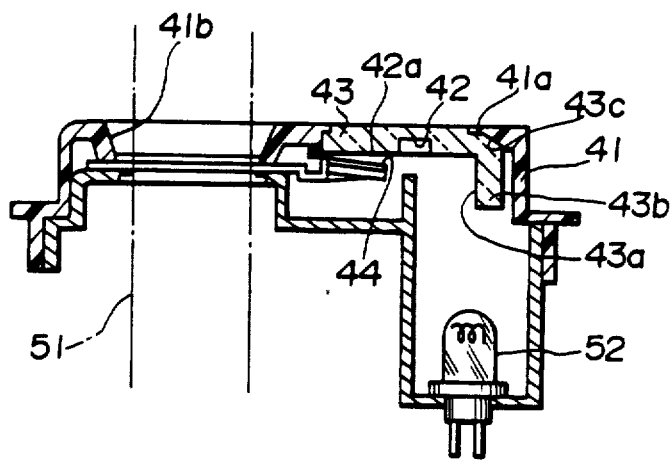
FIG. 7 is a view similar to FIG. 1, but showing a conventional shift lever unit.
Figure 8:
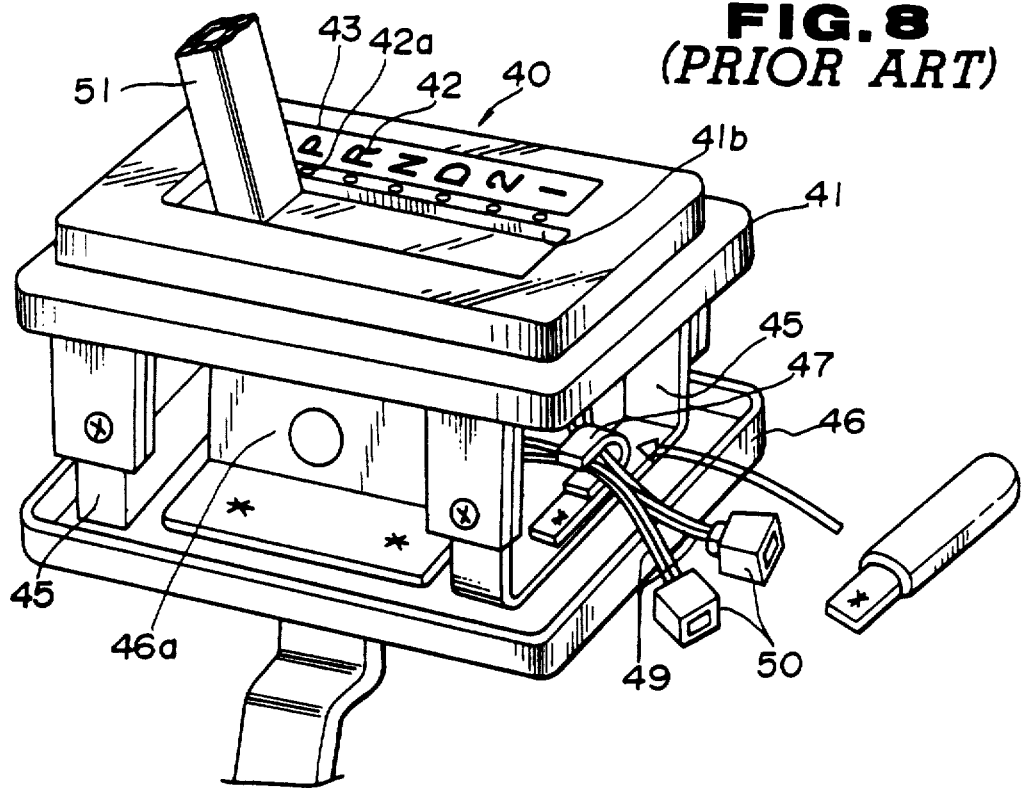
FIG. 8 is a perspective view of the conventional shift lever unit.

As shown in FIG. 6, if desired, the shift lever 3 may be equipped with a rotatable collar member 32 at a portion located within the slot 4. With the collar member 32, the movement of the shift lever 3 in the slot 4 is much smoothed.

In the following, advantages of the present invention will be described.

First, since the light reflecting surfaces 8 and 16 of the light conductive member 5 are granulated, the light reaching the eyes EP (see FIG. 1) of the driver is softened.

Second, since the position mark plate 6 is exposed to the outside of the housing 2 at only the small raised portions 6b thereof, direct rays of the sun toward the upper cover portion 9 of the housing 2 do not cause a dazzling reflection of the light rays on the upper cover portion 9. Furthermore, the PossibilitY of having the position mark plate 6 flawed and cracked is lowered.

What is claimed is:

1. A shift lever unit comprising:
   a shift lever;
   a housing of plastic having an upper cover portion, said upper cover portion being formed with a slot through which said shift lever passes;
   a position mark plate of transparent plastic mounted on said upper cover portion, said position mark plate having a plurality of position marks on an upper surface thereof;
   a light blocking layer covering the upper surface of said position mark plate except the positions where the position marks are located;
   a light source installed in said housing;
   a light conductive member of transparent plastic, said light conductive member including a horizontal part whose leading end is formed with a first light reflecting surface and located behind said position mark plate, a vertical part which is formed with a rounded recess from which light rays from said light source enter said vertical part, and a jointed part at which said horizontal and vertical parts are jointed, said jointed part being formed with a second light reflecting surface by which said light rays from said rounded recess is reflected toward said first light reflecting surface;
   a plurality of raised window portions formed by said horizontal part of said light conductive member, said window portions being exposed to the outside of the housing at positions beside said position marks; and
   a pointer movably located within said housing below said raised window portions, said pointer being movable together with said shift lever,
   wherein said first light reflecting surface is granulated.

2. A shift lever unit as claimed in claim 1, in which said horizontal part of said light conductive member is further provided with a third light reflecting surface by which said light rays from said rounded recess is reflected toward said pointer, said third light reflecting surface being granulated.

3. A shift lever unit as claimed in claim 2, in which said first light reflecting surface is so shaped as to reflect said light rays toward said position mark plate, and in which said pointer is so shaped as to reflect said light rays toward one of said raised window portions of said horizontal part.

4. A shift lever unit as claimed in claim 3, in which said first light reflecting surface constitutes an inclined lower surface of a tapered leading portion of said horizontal part of said light conductive member.

5. A shift lever unit as claimed in claim 4, in which said tapered leading portion has a flat upper surface which intimately contacts with a lower flat surface of said position mark plate.

6. A shift lever unit as claimed in claim 5, in which said inclined lower surface of said tapered leading portion is intimately attached to a tapered surface portion defined by said housing.

7. A shift lever unit as claimed in claim 2, in which said raised window portions of said horizontal part are respectively received in openings formed in said upper cover portion of said housing.

8. A shift lever unit as claimed in claim 7, in which said raised window portions are projected outward from the corresponding openings of said upper cover portion of the housing.

9. A shift lever unit as claimed in claim 2, in which said pointer has an upper light reflecting surface which faces up to an inclined lower surface of said horizontal part of said light conductive member said inclined lower surface being located just below said raised window portions.

10. A shift lever unit as claimed in claim 9, in which said pointer is a part of a slide plate, said slide plate being formed with a laterally extending slot through which said shift lever passes.

11. A shift lever unit as claimed in claim 10, in which said upper light reflecting surface of said pointer is colored with red paint.

* * * * *